United States Patent [19]
Paisley

[11] Patent Number: 6,024,932
[45] Date of Patent: Feb. 15, 2000

[54] METHOD FOR THE CONVERSION OF GYPSUM TO ELEMENTAL SULFUR

[75] Inventor: Mark A. Paisley, Columbus, Ohio

[73] Assignee: Gas Research Institute, Chicago, Ill.

[21] Appl. No.: 08/060,422

[22] Filed: May 11, 1993

[51] Int. Cl.[7] .......................... C01B 17/00; C01B 17/02; B01J 8/18
[52] U.S. Cl. .................................. 423/567.1; 423/541.1; 423/555; 423/566.3; 423/569; 422/129; 422/142; 422/189; 422/198
[58] Field of Search ................................ 423/541 R, 555, 423/566.3, 567 R, 569, 541.1, 567.1; 422/142, 129, 189, 198

[56] References Cited

U.S. PATENT DOCUMENTS

| | | | |
|---|---|---|---|
| 2,863,726 | 12/1958 | Kamlet | 23/181 |
| 3,087,790 | 4/1963 | Wheelock et al. | 423/541 |
| 3,582,276 | 6/1971 | Campbell et al. | 23/177 |
| 3,607,036 | 9/1971 | Froecking et al. | 23/177 |
| 3,607,045 | 9/1971 | Wheelock et al. | 23/186 |
| 3,661,518 | 5/1972 | Orahood | 23/137 |
| 3,729,551 | 4/1973 | Gorin | 423/638 |
| 3,904,387 | 9/1975 | Kertamus et al. | 48/210 |
| 4,041,141 | 8/1977 | Moss | 423/571 |
| 4,066,738 | 1/1978 | Daman | 423/569 |
| 4,102,989 | 7/1978 | Wheelock | 423/541 |
| 4,147,762 | 4/1979 | Steiner | 423/569 |
| 4,309,198 | 1/1982 | Moss | 48/197 |
| 4,704,136 | 11/1987 | Weston et al. | 48/197 |
| 4,963,513 | 10/1990 | Marten | 48/210 |

OTHER PUBLICATIONS

"Decomposition of Gypsum in a Fluidized–Bed Reactor" by D A Martin et al; Bureau of Mines Investigation Report No. 6286;1963.

Primary Examiner—Gary P. Straub
Assistant Examiner—Timothy C Vanoy
Attorney, Agent, or Firm—Pauley Petersen Kinne & Fejer; Philip J. Pollick

[57] ABSTRACT

A process for the recovery of sulfur and carbon monoxide from metal sulfates in which the carbon monoxide is recycled as a reducing agent for reaction with the metal sulfate. Metal sulfates such as gypsum (calcium sulfate dihydrate) are processed to form sulfur dioxide. The sulfur dioxide is contacted with carbonaceous matter at sufficiently high temperature to form elemental sulfur and carbon monoxide. The carbon monoxide is then recycled for use as a reducing agent in the initial processing of the metal sulfate.

30 Claims, 1 Drawing Sheet

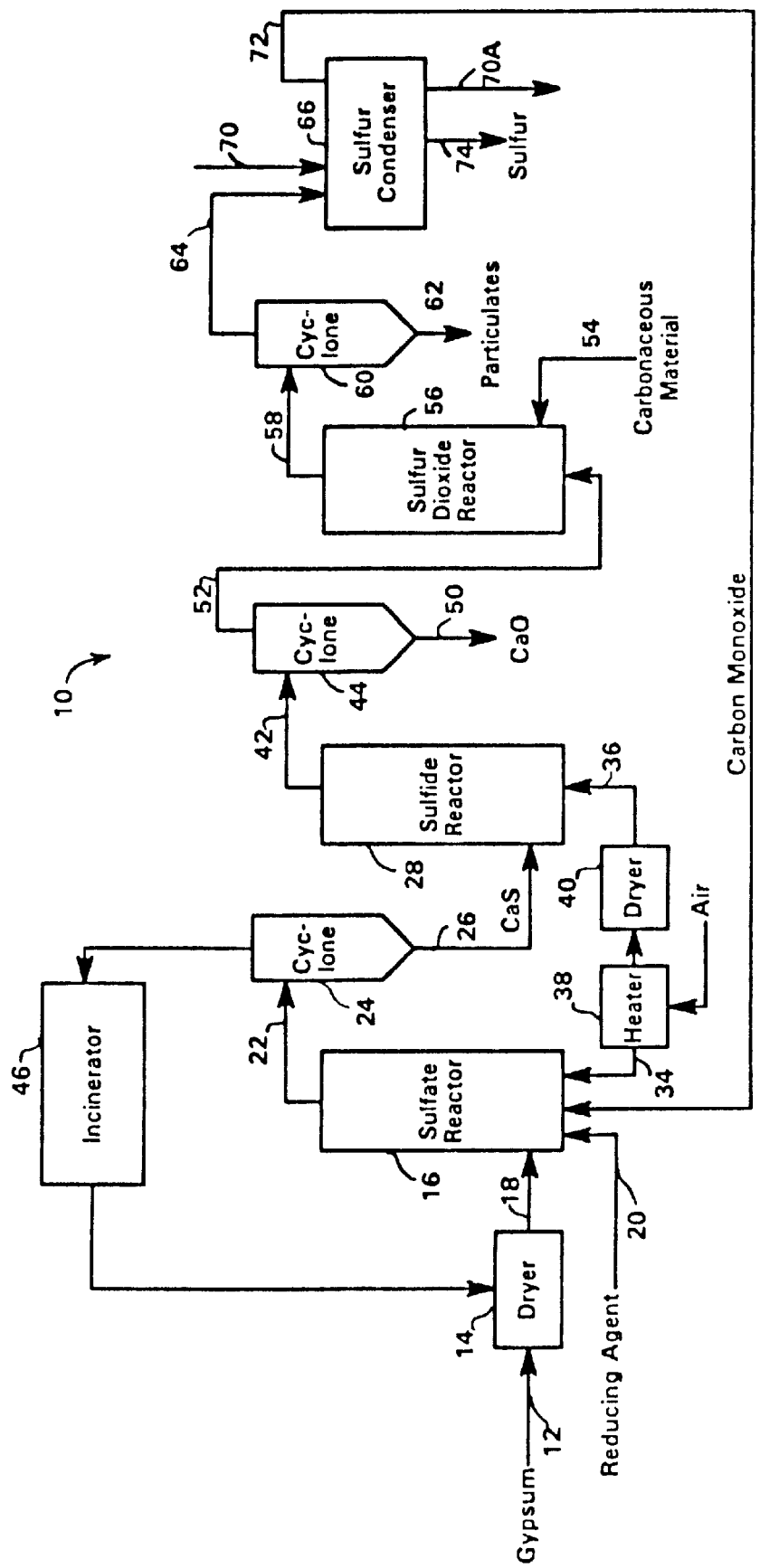

METHOD FOR THE CONVERSION OF GYPSUM TO ELEMENTAL SULFUR

BACKGROUND OF THE INVENTION

1. Field of the Invention

The present invention relates to a method for the improved processing of metal sulfates. More particularly, it relates to the recovery of sulfur dioxide from the metal sulfate followed by reaction of the sulfur dioxide with a carbonaceous material to yield elemental sulfur and carbon monoxide. The carbon monoxide is recycled for use in the initial processing of the sulfate to yield sulfur dioxide.

2. Background

A wide variety of processes have been developed for the production of sulfur values from metal sulfates and sulfides. These processes serve to improve operating efficiencies and more recently, to reduce environmental problems caused by waste product (solid sulfate) accumulation. Various forms of sulfur are recovered from these processes including sulfur dioxide, hydrogen sulfide and elemental sulfur. Sulfur dioxide is the desired product when sulfuric acid production is the objective while safety and economic considerations make sulfur the product of choice when shipment is required.

In another area of concern, high-sulfur fuels are notorious for the formation of copious amounts of environmental contaminant. As a result, there has been underway for some time efforts to remove sulfur from these high-sulfur, liquid and solid fuels. Although metal sulfates have been used in the removal process, there has been, prior to this invention, no effort to combine the sulfur recovery from fuels with the solid sulfate accumulation problem in a process that provides maximum energy and sulfur value recovery.

One example of the environmental concern for solid waste sulfate accumulation is readily apparent in the fertilizer industry where gypsum (calcium sulfate dihydrate) is produced in large quantities as the by-product of the conversion of phosphate rock (apatite or calcium phosphate) to phosphoric acid using sulfuric acid. Mounds of such by-product gypsum pose severe environmental problems as acidified rainwater (often from the burning of sulfur containing fuels) produces large runoffs of soluble compounds from the accumulations of gypsum by-product. Because of these large stockpiles of waste gypsum, there is a continuing need for efficient gypsum processing to reduce these stockpiles in a manner that is energy and end product efficient.

Because of this need, a wide variety of processes has already been developed for the processing of metal sulfates such as gypsum ($CaSO_4$). These processes focus on the recovery of lime (CaO) and a form of sulfur, typically either elemental sulfur (S) or sulfur dioxide ($SO_2$) with the later often used in the production of sulfuric acid. These processes typically involve 1) the reduction of the metal sulfate to form the metal oxide and sulfur dioxide or 2) the reduction of the metal sulfate to the metal sulfide followed by an oxidation step for the conversion of the sulfide to sulfur and/or sulfur dioxide.

The reductive decomposition of calcium sulfate is more fully illustrated by the following equations:

$$CaSO_4+CO \rightarrow CaO+CO_2+SO_2 \qquad (1)$$

$$CaSO_4+H_2 \rightarrow CaO+H_2O+SO_2 \qquad (2)$$

$$CaSO_4+4CO \rightarrow CaS+4CO_2 \qquad (3)$$

$$CaSO_4+4H_2 \rightarrow CaS+4H_2O \qquad (4)$$

Equations (1) and (2) are carried out under what is referred to as mildly reducing conditions, that is, with a relatively low amount of reducing agent such as carbon monoxide or hydrogen or both. Reactions (1) and (2) require heat, i.e., are endothermic, and are favored by higher reaction temperatures. Reactions (3) and (4) are carried out under strongly reducing conditions, that is, with a high amount of reducing agent such as carbon monoxide or hydrogen or both. Reactions (3) and (4) give off heat, i.e., are exothermic, and are favored by lower reaction temperatures. As noted by Wheelock (U.S. Pat. No. 3,087,790), the use of an excess amount of carbon dioxide with the reducing gas discourages the sulfide production of equation (3).

The reactions that take place in the oxidation of calcium sulfide include:

$$2CaS+3O_2 \rightarrow 2CaO+2SO_2 \qquad (5)$$

$$CaS+2O_2 \rightarrow CaSO_4 \qquad (6)$$

$$CaS+CaSO_4 \rightarrow 2CaO+2SO_2 \qquad (7)$$

$$2CaSO_4 \rightarrow 2CaO+2SO_2+O_2 \qquad (8)$$

Reactions (5) and (6) are exothermic with reaction (5) being favored at higher temperatures. Reactions (7) and (8) are endothermic. Overall, equations (5)–(8) can be approximated by the following overall reaction:

$$CaS+O_2+CaSO_4 \rightarrow 2CaO+2SO_2 \qquad (9)$$

There have been a large number of efforts to maximize the efficiencies of sulfate reduction including an emphasis on the use of mild reduction (equations (1) and (2)) or strong reduction (equations (3) and (4)). The direction of these efforts is often determined by the use of the sulfur dioxide product and energy values involved.

If the source of the sulfate is from a process using sulfuric acid, e.g., wet process phosphoric acid production, it is often desirable to use the sulfur dioxide in a conventional sulfuric acid plant such as is done in Wheelock (U.S. Pat. No. 3,087,790), Campbell et al (U.S. Pat. No. 3,582,276), Foecking (U.S. Pat. No. 3,607,036), and Marten (U.S. Pat. No. 4,963,513). Although the on-site production of sulfuric acid from sulfate byproduct is convenient, the economic laws of supply and demand often produce an oversupply of sulfuric acid at one site and a scarcity at another. Since sulfuric acid contains only about one third sulfur and for safety reasons, it is often desirable to recover elemental sulfur from the sulfate. Also as noted in Kamlet (U.S. Pat. No. 2,863,726), it is more desirable to ship sulfur than sulfuric acid since often elemental sulfur or products derived from elemental sulfur, e.g., hydrogen sulfide, sodium sulfide, colloidal sulfur, sodium hydrosulfite, liquid sulfur dioxide, etc. are required at the final destination.

As a result, Gorin (U.S. Pat. No. 3,729,551) uses a two stage process in which $CaSO_4$ is reduced with hydrocarbonaceous solids and air to afford CaS, hydrogen, and carbon monoxide. The CaS is oxidized with air to afford $SO_2$ and the $SO_2$ is reduced using hydrogen and carbon monoxide to afford sulfur using a Claus process. Although the Claus process is well known and used for the conversion of sulfur dioxide to sulfur, it also requires a large amount of capital equipment and substantial quantities of fuel.

Another set of reactions for the conversion of metal sulfates involves the initial formation of hydrogen sulfide which may then be converted to sulfur. Kamlet (U.S. Pat. No. 2,863,726), Orahood (U.S. Pat. No. 3,661,518) and Weston et al (U.S. Pat. No. 4,704,136) teach such a conversion. Kamlet forms sulfur and hydrogen sulfide in a method for Portland cement clinker production. Orahood teaches the conversion of $CaSO_4$ to CaS which is converted to $H_2S$ using $CO_2$. Weston uses an eutectic of alkali and alkaline earth sulfates. The sulfates are reduced to sulfides and converted to $H_2S$ by reaction with water and carbon dioxide. The $H_2S$ is used to form sulfuric acid using a conventional contact type sulfuric acid plant or converted to sulfur using the Claus process.

Fuel production and the removal of sulfur impurities from liquid and solid fuels, have resulted in several processes involving the reaction of carbonaceous materials and sulfur dioxide. In Kertamus et al (U.S. Pat. No. 3,904,387), a combustible fuel gas is produced by heating solid char or coke with sulfur dioxide. The process produces gaseous carbon monoxide and elemental sulfur. The carbon monoxide is used as a fuel or in petrochemical applications. Moss (U.S. Pat. Nos. 4,041,141 and 4,309,198) converts sulfur dioxide produced from metal sulfides and sulfates to sulfur and carbon oxides, preferably carbon dioxide, by passing the sulfur dioxide through a layer of char. The resulting carbon oxides are vented to the atmosphere. Steiner (U.S. Pat. No. 4,147,762) describes the conversion of sulfur dioxide to sulfur using coal and steam while Daman (U.S. Pat. No. 4,066,738) uses a similar process to recover sulfur from a hydrocarbon fuel. In both cases, the use of steam results in the formation of hydrogen sulfide.

Although various techniques have been developed to reduce the sulfur content of solid and liquid fuels and many of these techniques involve the conversion of sulfur dioxide to elemental sulfur, the full potential of these methods has not been realized in the recovery of chemical values from metal sulfates such as gypsum. In those instances where it has been applied, little if anything has been done to optimize the gaseous products accompanying sulfur production other than the venting of such gases to the atmosphere.

SUMMARY OF THE INVENTION

It is an object of this invention to produce elemental sulfur values from metal sulfates while reducing the amount of capital equipment and fuel requirements required by the conventional Claus process. It is a further object of this invention to optimize the composition of by-product gases from sulfur production for recycle use in initial sulfate processing.

This invention features the conversion of metal sulfates to sulfur dioxide gas. The sulfur dioxide is reduced to elemental sulfur and carbon monoxide using a carbonaceous material. As a consequence, the invention has the advantage of providing a form of sulfur, elemental sulfur, that is easy, safe, and economical to transport. The invention has the further advantage of providing a stream of carbon monoxide from the elemental sulfur recovery that can be recycled and used in the initial processing of the metal sulfate.

This invention features a process for the recovery of sulfur from a metal sulfate comprising the steps of a) processing the metal sulfate to form sulfur dioxide; b) reacting the sulfur dioxide with a carbon source to produce elemental sulfur and a stream of carbon monoxide and c) recycling the carbon monoxide for use as a reducing agent in the initial processing of the metal sulfate to form sulfur dioxide.

The metal sulfates, which include alkali sulfates, alkaline earth sulfates such as gypsum ($CaSO_4.2H_2O$) and other metal sulfates such as copper sulfate and zinc sulfate, and mixtures thereof can be processed to form sulfur dioxide by reduction of the sulfate to the metal sulfide followed by oxidation to the metal oxide and sulfur dioxide. The reduction to the sulfide can be carried out using a reducing agent such as carbon monoxide, wood gas, carbonaceous materials, liquid fuels, natural gas, reform gas and the like along with an oxygen provider such as air mixed in such portions so as to afford a reducing mixture. The process temperature will vary depending on the metal sulfate, reducing agent and oxygen provider.

For the reduction of gypsum ($CaSO_4.2H_2O$) to calcium sulfide using an air and natural gas mixture, the reduction is carried out at 1400–1800° F. (760–982° C.) with a temperature of about 1500–1600° F. (816–871° C.) being preferred. The gypsum reduction is carried out in any suitable reactor, although a fluidized bed reactor is preferred with a circulating fluidized bed reactor being most preferred. Gaseous by-products from the gypsum reduction may be incinerated and the heat values used to heat the reducing mixture prior to its use in reducing the calcium sulfate to sulfide.

After reduction to the sulfide, the processing is completed by oxidation of the metal sulfide to the metal oxide and sulfur dioxide using dry air. For calcium sulfide, a reaction temperature of 1700–2300° F. (927–1260° C.) is used. At lower temperatures, the oxidation takes place slowly while above these temperatures, fusion of the solids can occur. An oxidizing agent such as dry air or oxygen is used to avoid the formation of undesirable hydrogen sulfide.

Product sulfur dioxide is then contacted with carbonaceous matter to produce a gaseous mixture of carbon dioxide and elemental sulfur according to the following equation:

$$4C+2SO_2 \rightarrow 4CO+S_2(gaseous) \quad (10)$$

Entrained solids are removed from the gaseous mixture and the latter is cooled to condense the sulfur and leave a by-product gas comprising carbon monoxide. A temperature above about 1800° F. (982° C.) and preferably above 2000° F. (1093° C.) is used to favor the formation of carbon monoxide rather than carbon dioxide.

The carbonaceous matter should contain less than about 1% by weight of hydrogen to avoid the formation of unwanted hydrogen sulfide. Carbonaceous matter derived from a conventional gasification process or coke such as used for metallurgical processing may be used. The carbonaceous matter typically converts the available sulfur dioxide to carbon monoxide in yields of 95–100% when air is used to oxidize the sulfide; the resulting gas has a carbon monoxide content of 25–30% and a heat value of more than 90 Btu/scf. The use of dry oxygen to oxidize the sulfide can give a by-product gas with a heat value of more than 300 Btu/scf. However, the use of air is preferred in the sulfide oxidization step. The by-product gas, rich in carbon monoxide, is then recycled back to the metal sulfate processing stage where it is used as a reducing agent to reduce the metal sulfate.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

BRIEF DESCRIPTION OF THE DRAWINGS

The FIGURE is a schematic of an embodiment of the invention.

In describing the preferred embodiment of the invention which is illustrated in the drawing, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

The FIGURE illustrates one embodiment of the invention, a three-stage process for recovering elemental sulfur and carbon monoxide from waste gypsum and is indicated generally by the number 10. Particulate waste gypsum $CaSO_4 \cdot 2H_2O$ in stream 12 is dried or dehydrated to anhydride $CaSO_4$ in a dryer/calciner 14. The anhydride is feed to a first reactor 16 (the sulfate reactor) via a feed system 18. In reactor 16, the anhydride is reduced to CaS by means of a reducing agent such as a medium BTU wood gas feed to reactor 16 via stream 20. Generally the sulfate and reducing gas in reactor 16 are heated to a temperature from about 1300° F. (704° C.) to 1800° F. (982° C.) and maintained in reactor 16 in this temperature range for a period of about two seconds to about thirty minutes. The preferred temperature for reducing the sulfate is about 1500° F. (816° C.) to about 1600° F. (871° C.). The product stream 22 leaving the reactor contains CaS as well as other by-products of the reduction reaction is illustrated by equations (3) and (4) above and the following equations:

$$CaSO_4 + CH_4 \rightarrow CO_2 + 2H_2O + CaS \qquad (10)$$

$$CaSO_4 + CO \rightarrow CaSO_3 + CO_2 \qquad (11)$$

$$CaSO_4 + H_2 \rightarrow CaSO_3 + H_2O \qquad (12)$$

When a reducing gas is used as the reducing agent in reactor 16, it is preferably used in a ratio of about 10 to 12 SCF per pound of anhydrous $CaSO_4$. This level of reducing gas is considered optimum for processing. Larger quantities of gas may be used but gas in excess of these levels will not react with the sulfate and thus impact negatively on the economies of the process. Lower quantities of reducing gas result in some unreacted $CaSO_4$ leaving the reactor, thus reducing the overall process efficiency.

The product stream 22 is fed to a separating means such as a cyclone separator 24 which separates the CaS from the gaseous by-products of the reactions. The CaS exits the cyclone 24 via stream 26 and is fed to a second reactor 28 where CaS is oxidized with air or other oxidizing agents such as oxygen to produce calcium oxide and sulfur dioxide. A surge tank (not shown) may be optionally provided in the CaS feed stream 26 to provide even flow.

The gases obtained from the separation step in cyclone 24 have a low heat value, e.g., 42 Btu/SCF when medium Btu gas is used as the reducing agent, and may be incinerated in incinerator 46, and thereafter heat exchanged with the incoming gypsum in stream 12 to recover the heat value.

In the second reactor 28 (the sulfide reactor), the calcium sulfide is reacted with hot air or other oxidizing agent such as oxygen at a temperature high enough to prevent formation of $CaSO_4$ and to produce CaO and a gas stream containing sulfur dioxide $SO_2$. Generally the temperature in the second reactor is between about 1700° F. (927° C.) and about 2300° F. (1260° C.) with a temperature of about 2000° F. (1093° C.) being preferred. The sulfide and oxidizing agent are maintained in the second reactor within this temperature range for a period of about one second to about one minute.

An oxidizing agent, typically air is provided to both reactors 16 and 28 via streams 34 and 36, respectively. The air is heated in heater 38 to operating temperature. Prior to entering reactor 28, the air is dried in dryer 40. By providing dry air, the $SO_2$ stream leaving reactor 28 is free of water and unwanted hydrogen sulfide.

The $SO_2$ and CaO leave reactor 28 via stream 42 which is passed through a separating device such as cyclone separator 44 allowing collection of CaO at the end of stream 50. The $SO_2$ emerges from cyclone 44 in stream 52 which passes to a third reactor 56 (the sulfur dioxide reactor). Hot carbonaceous matter is supplied via stream 54 to reactor 56 where it is contacted with the $SO_2$ in stream 52. The carbonaceous matter contains less than about one percent by weight of hydrogen to avoid hydrogen sulfide formation. Char derived from a conventional gasification process or coke such as that used for various metallurgical processes typically meets this requirement. The sulfur dioxide reacts with the carbonaceous matter in reactor 56 to produce a gaseous mixture of carbon monoxide and elemental sulfur as follows:

$$4C + 2SO_2 \rightarrow 4CO + S_2 \qquad (13)$$

Reactor 56 is maintained at a temperature above at least 1800° F. (982° C.) with a temperature of above 2000° F. (1093° F. being preferred in order to minimize the formation of carbon dioxide.

The gaseous mixture from reactor 56 is conveyed in stream 58 to a separator such as cyclone separator 60 for removal of ungasified particulates. These particulates exit separator 60 via stream 62. The substantially solids-free gaseous mixture of carbon monoxide and elemental sulfur leaves the cyclone separator 60 in stream 64 and is conveyed to sulfur condenser 66. Condenser 66 may be any suitable heat exchanger such as a shell and tube heat exchanger in which the gaseous mixture 64 flows through the tubes and a coolant 70 enters the condenser 66, passes over the tubes, and leaves via 70A. The heat exchange parameters are such that the gaseous mixture 64 within condenser 66 is maintained at a controlled temperature in the range of 280° F. (138° C.) to 315° F. (157° C.) to dissociate the carbon monoxide and elemental sulfur as follows:

$$4CO + S_2(gas) \rightarrow 4CO + 2S(liquid) \qquad (14)$$

The by-product gas emerging as stream 72 has a carbon monoxide content in the range of 25–30% and a heat value in excess of 90 Btu/scf when air is used as the oxidizing agent in second reactor 28. The by-product gas leaving condenser 26 is a high quality clean gas that is recirculated to reactor 16 for use in the reduction of the gypsum feed 12. The liquid sulfur leaves condenser 66 through stream 74.

Although yields of carbon monoxide above 90% are preferred for the chosen reaction scheme, it is to be realized that other ratios of carbon monoxide and carbon dioxide may be used for other sulfate conversion reactions as exemplified by equations (1)–(4). This is further discussed in Wheelock et al (U.S. Pat. No. 3,087,790) which is herein incorporated by reference.

Reactors 16, 28 and 56 are preferably fluidized-bed or circulating fluidized bed reactors. A fluidized bed reactor is defined as a reactor system in which gas passes upwardly through a bed of fine particles causing the bed to expand and behave as a fluid. The superficial gas velocity at which this occurs is well defined for a particular system and referred to as the minimum fluidization velocity. A reactor operating between this velocity and the terminal velocity of the particles in the free space above the bed is referred to as a bubbling fluidized bed reactor.

A circulating fluidized bed reactor is defined as one in which the reactor bed is pneumatically conveyed through the reactor by a gas stream. Gas velocities in the circulating fluidized bed reactor must be above the particle terminal velocities. Solids are continuously removed from the top of the reactor and circulated on to the next stage of the system.

The following examples further illustrate various aspects of the invention.

EXAMPLE 1

A gypsum reduction to sulfide was carried out in a six inch diameter fluidized bed reactor that was 13 feet high. The bed depth was 18 inches and gas velocities were about 1 foot per second during reaction. The temperature ranged from 1200° (649° C.) to 1600° F. (871° C.) in the fluidized bed reactor. The reactor was used for a first stage reduction using a synthetic medium BTU fuel gas such as might be generated by wood gasification. The gas was fed into the bottom of the reactor 16 to fluidize the sulfate and reduce it to CaS. Typically, the gas was composed of hydrogen, carbon monoxide, methane and ethane as shown in Table I.

TABLE I

MEDIUM BTU GAS ANALYSIS

| Component | Vol. % |
|---|---|
| Hydrogen | 17.76 |
| Carbon Monoxide | 50.09 |
| Carbon Dioxide | 9.88 |
| Methane | 16.76 |
| Ethane | 5.81 |

In addition to the fluid bed reactor, reductions were also run in thermogravimetric analysis (TGA) equipment with small quantities of material. The equipment was arranged to permit the introduction of the reducing gas. Test results for the conversion of gypsum to CaS, along with results from the fluid bed reactor are shown in Table II. Results from using anhydride ($CaSO_4$) in place of gypsum ($CaSO_4 \cdot 2H_2O$) in the reactor are also shown.

TABLE II

GYPSUM CONVERSION TO CALCIUM SULFIDE CORRECTED FOR RAW MATERIAL ANALYSIS (FEED MATERIAL 90% GYPSUM)

| Temp ° F. (° C.) | TGA Gypsum | Fluidized Bed Gypsum | Fluidized Bed Anhydride |
|---|---|---|---|
| 1200 (649) | 0.41 | | 4.12 |
| 1400 (760) | 13.23 | | |
| 1450 (788) | | | 23.32 |
| 1475 (802) | | | 42.40 |
| 1480 (804) | | | 90.6 |
| 1485 (807) | | 50.53 | |
| 1485 (807) | | 51.00 | |
| 1500 (816) | 46.40 | | |
| 1510 (821) | | | 103.76 |
| 1519 (826) | | | 84.5 |
| 1577 (858) | | | |
| 1600 (871) | 105.73 | | |
| 1600 (871) | 104.21 | 98.03 | |
| 1800 (982) | 103.40 | | |

It is noted from TGA tests that the yield (CaS conversion) gradually increased over the temperature range from 1400° F. (760° C.) to 1600° F. (871° C.), leveling off at 1600° F. (871° C.) since no further increases were obtained at 1800° F. (982° C.). Similar results were obtained in the fluidized bed reactor from practically no conversion at 1200° F. (649° C.) to 98.03% at 1600° F. (871° C.) again using gypsum as the bed material. For tests with anhydride, yields were higher at lower temperatures with 100% conversion obtained at temperatures of about 1500° F. (816° C.). Even at 1480° F. (804° C.), a 90% yield was obtained.

EXAMPLE 2

In addition to the medium Btu gas (wood gas), tests were run with natural gas, partially oxidized natural gas and carbon monoxide using the TGA equipment. The results are shown in Table III.

TABLE III

GYPSUM CONVERSION TO CaS WITH VARIOUS REDUCING GASES

| GAS | TEMPERATURE ° F. (° C.) | Percent Conversion Adjusted for Raw Material |
|---|---|---|
| Medium Btu Gas | 1415 (768) | 24.8 |
|  | 1550 (843) | 106.6 |
| Natural Gas | 1415 (768) | 14.75 |
| Partially Oxidized Natural Gas | 1550 (843) | 98.5 |
| Carbon Monoxide | 1450 (788) | 83.4 |
|  | 1550 (843) | 106.4 |

It is evident that with medium Btu gas, a temperature of about 1550° F. (843° C.) is required for sulfate conversion. For carbon dioxide, lower temperatures give effective conversion. Natural gas did not give efficient performance. However, when partially oxidized, efficiency rose to a level comparable with wood gas. This is believed due to the carbon monoxide formed during partial oxidation.

EXAMPLE 3

Conversion of CaS to $SO_2$ was run in the fluidized bed reactor with air. The bed was filled with calcium sulfide at a temperature of about 1300° F. (704° C.). Air at room temperature was admitted and the temperature rapidly increased to 1950 ° F. (1066° C.). The product gas analysis showed 81.75 percent conversion of the sulfide sulfur to $SO_2$. In a second run, the temperature rose to about 2000° F. (1093° C.) and held at that level for an hour. About 88 percent of the sulfur was converted to $SO_2$ gas. Further details for the conversion of $SO_2$ to sulfur and carbon dioxide are given in Kertamus et al, U.S. Pat. No. 3,904,387 all of which is herein incorporated by reference.

Although that which is described above and shown in the FIGURE is preferred, it is to be appreciated that various modifications in equipment and chemical reactions can be made to the illustrated design and preferred reactions, such as a combination of reactors or an emphasis on different reactions as has been demonstrated in the prior art. However, in making such modifications, it is to be realized that the present invention relies on the production of sulfur dioxide that is converted to elemental sulfur using a carbonaceous material. The sulfur dioxide not only yields elemental sulfur but also carbon monoxide, the carbon monoxide being recirculated for use as a reducing agent in the reduction of the metal sulfate. Thus equipment or reaction modifications that afford chemical moieties that interfere with this objective are to be avoided. It is also to be understood that the production of carbon oxides from sulfur dioxide is temperature dependent with higher temperatures favoring carbon monoxide production. However, lower temperatures may be used to give higher yields of carbon dioxide for use in sulfate reduction under mild conditions.

It is to be further understood that although the present invention has been specifically disclosed with the preferred embodiment and examples, modifications to the experimental design may be apparent to those skilled in the art and such modifications and variations are considered to be within the scope of the invention and the appended claims. It is also intended that all matter contained in the above description shall be interpreted as illustrative and not in a limiting sense, the scope of the invention being indicated by the appended claims rather than by the foregoing description, and all changes that come within the meaning and range of equivalency of the claims are therefore intended to be embraced therein. That is, the following claims are intended to cover all of the generic and specific features of the invention herein described, and all statements of the scope of the invention which, as a matter of language, fall therebetween. Furthermore, it is to be understood that in the following claims, ingredients or compounds recited in the singular are intended to include compatible mixtures of such ingredients wherever the sense permits.

I claim:

1. A process for sulfur recovery from a metal sulfate, which comprises the steps of:
    feeding said metal sulfate to a first reactor;
    feeding a reducing agent to said first reactor, said reducing agent including recycle carbon monoxide from a step of contacting sulfur dioxide with a carbonaceous matter;
    contacting said metal sulfate and said reducing agent at a temperature and for a period of time sufficient to effect reduction of said metal sulfate to a metal sulfide thereby producing a product stream containing said metal sulfide and gaseous waste by-products of said reduction;
    removing said product stream from said first reactor;
    separating said metal sulfide from said gaseous waste by-products in said product stream;
    oxidizing said metal sulfide to form a metal oxide and sulfur dioxide in a second reactor;
    contacting said sulfur dioxide with carbonaceous matter to produce elemental sulfur and said recycle carbon monoxide, said recycle carbon monoxide being produced in sufficient quantity and purity for use in said step of reducing said metal sulfate to form said metal sulfate;
    recycling said recycle carbon monoxide for use as a portion of said reducing agent in said step of reducing said metal sulfate to form said metal sulfide; and
    incinerating said waste by-products from said reduction and using the heat produced thereby to heat said metal sulfate fed to said first reactor.

2. The process for sulfur recovery according to claim 1 wherein said reducing agent comprises a hydrocarbon gas.

3. The process for sulfur recovery according to claim 1 wherein said separating of said metal sulfide from said gaseous waste by-products is carried out with a cyclone separator.

4. The process for sulfur recovery according to claim 1 wherein said metal sulfate is calcium sulfate and said step of contacting said metal sulfate and said reducing agent step includes heating said metal sulfate and said reducing agent to a temperature from about 1300° F. (704° C.) to about 1800° F. (982° C.) and maintaining said metal sulfate and said reducing agent in said first reactor for a period of about 2 seconds to about 30 minutes.

5. The process for sulfur recovery according to claim 1 wherein said step of contacting said metal sulfate and said reducing agent is carried out in a fluidized bed reactor.

6. The process for sulfur recovery according to claim 1 wherein said first reactor is a circulating fluidized bed reactor.

7. The process for sulfur recovery according to claim 1 wherein said step of oxidizing said metal sulfide further comprises the steps of:
    feeding said metal sulfide to a second separate reactor;
    feeding an oxidizing agent to said second separate reactor;
    contacting said metal sulfide and said oxidizing agent at a temperature and for a period of time sufficient to effect oxidation of said metal sulfide to a metal oxide with production of sulfur dioxide thereby producing a product stream containing said metal oxide and said sulfur dioxide;
    removing said product stream from said second separate reactor; and
    separating said metal oxide from said sulfur dioxide.

8. The process for sulfur recovery according to claim 7 wherein said sulfide and said oxidizing agent feed to said second reactor is substantially free of water and hydrogen sulfide.

9. The process for sulfur recovery according to claim 7 with said oxidizing agent comprising air.

10. The process for sulfur recovery according to claim 7 wherein said second reactor is a circulating fluidized bed reactor.

11. The process for sulfur recovery according to claim 7 wherein said sulfide is calcium sulfide and said heating step includes heating said sulfide and said oxidizing agent to a temperature of from about 1700° F. (927° C.) to about 2300° F. (1260° C.) and maintaining said sulfide and said oxidizing agent at said temperature for a period of about one second to about one minute.

12. The process for sulfur recovery according to claim 7 wherein said separating of said sulfur dioxide from said metal oxide is carried out with a cyclone separator.

13. The process for sulfur recovery according to claim 1 wherein said contacting of said sulfur dioxide with said carbonaceous matter is carried out in a separate reactor.

14. The process for sulfur recovery according to claim 13 with said step of contacting said sulfur dioxide with said carbonaceous matter further comprising the step of:
   a) feeding said sulfur dioxide to a reactor;
   b) feeding said carbonaceous matter to said reactor;
   c) contacting said sulfur dioxide and said carbonaceous matter at a temperature and for a period of time sufficient to effect the production of a gaseous mixture of carbon monoxide and sulfur;
   d) removing entrained solids from said gaseous mixture; and
   e) removing said carbon monoxide from the substantially solid-free gaseous mixture by condensing said sulfur by heat exchange with a coolant.

15. The process for sulfur recovery according to claim 14 wherein said carbonaceous matter is char.

16. The process for sulfur recovery according to claim 14 wherein said carbonaceous matter is coke.

17. The process for sulfur recovery according to claim 14 including the step of fluidizing said carbonaceous matter in said reactor.

18. The process for sulfur recovery according to claim 17 wherein said step of fluidizing said carbonaceous matter is carried out with said sulfur dioxide.

19. The process for sulfur recovery according to claim 14 with said carbonaceous matter having less than about one percent by weight of hydrogen.

20. The process for sulfur recovery according to claim 14 wherein said contacting step is carried out at a temperature in excess of 1800° F.

21. The process for sulfur recovery according to claim 13 wherein said sulfur dioxide is converted to carbon monoxide in a yield of more than 90 percent.

22. The process for sulfur recovery according to claim 1 wherein said step of oxidizing said metal sulfide is carried out in a fluidized bed reactor.

23. The process for sulfur recovery according to claim 1 wherein said metal sulfate is an alkaline earth metal sulfate.

24. The process for sulfur recovery according to claim 23 wherein said alkaline earth metal sulfate is calcium sulfate.

25. The process for sulfur recovery according to claim 23 wherein said alkaline earth metal sulfate is gypsum.

26. An apparatus for the conversion of metal sulfates to sulfur and carbon monoxide with recycle of said carbon monoxide comprising:
   a first reactor for reducing a metal sulfate to a corresponding sulfide;
   means for feeding said metal sulfate and a reducing agent to said first reactor;
   means for contacting said metal sulfate and said reducing agent at a temperature and for a period of time sufficient to effect reduction of said metal sulfate to the corresponding sulfide thereby producing a product stream containing said sulfide and waste by-products;
   means for removing said product stream from said first reactor;
   means for separating said sulfide from said waste by-products;
   a second reactor for oxidizing said sulfide to a corresponding oxide;
   means for feeding said sulfide and an oxidizing agent to said second reactor;
   means for contacting said sulfide and said oxidizing agent at a temperature and for a period of time sufficient to effect oxidation of said sulfide to said corresponding oxide and sulfur dioxide thereby producing a product stream containing said oxide and sulfur dioxide;
   means for removing said oxide and said sulfur dioxide from said second reactor;
   means for separating said oxide from said sulfur dioxide;
   a third reactor for reducing said sulfur dioxide to sulfur and carbon monoxide;
   means for feeding said sulfur dioxide and a carbonaceous material to said third reactor;
   means for contacting said sulfur dioxide and said reducing agent at a temperature and for a period of time sufficient to effect the production of a gaseous mixture of carbon monoxide and sulfur;
   means for removing said gaseous mixture from said third reactor;
   means for separating said sulfur from said carbon monoxide;
   means for feeding said carbon monoxide to said first reactor; and
   means for incinerating said waste by-products of said reduction and heat exchanging said waste by-products with said metal sulfate entering said first reactor through said feeding means.

27. The apparatus according to claim 26 wherein said means for separating said sulfide from said waste by-products and means for separating said oxide from said sulfur dioxide comprise cyclone separators.

28. The apparatus according to claim 26 wherein said sulfate is calcium sulfate, wherein said sulfide is calcium sulfide and wherein said oxide is calcium oxide.

29. The apparatus according to claim 26 including means for drying said sulfate prior to feeding said sulfate to said first reactor.

30. The apparatus according to claim 26 with said means for separating said sulfur from said carbon monoxide comprising sulfur condensing means.

* * * * *